United States Patent [19]
Gaudin

[11] Patent Number: 5,829,691
[45] Date of Patent: Nov. 3, 1998

[54] METHOD AND APPARATUS FOR WASHING SOIL

[75] Inventor: Roudel Gaudin, Duson, La.

[73] Assignee: Soiltech Environmental Systems Inc., New York, N.Y.

[21] Appl. No.: 696,809

[22] Filed: Aug. 13, 1996

Related U.S. Application Data

[63] Continuation of Ser. No. 314,430, Sep. 28, 1994, abandoned, which is a continuation-in-part of Ser. No. 846,347, Mar. 5, 1992, abandoned.

[51] Int. Cl.⁶ .................................................. B02C 23/18
[52] U.S. Cl. .................................. 241/46.01; 241/46.17; 241/79.1; 241/DIG. 38
[58] Field of Search ............................ 241/21, 24, 46.01, 241/46.17, 79.1, DIG. 10, DIG. 38, 20

[56] References Cited

U.S. PATENT DOCUMENTS

| | | |
|---|---|---|
| 4,881,475 | 11/1989 | Deleur ....................................... 110/346 |
| 4,923,125 | 5/1990 | Bateson et al. ............................. 241/20 |
| 4,952,307 | 8/1990 | Adamache ................................. 209/166 |
| 5,055,196 | 10/1991 | Darian et al. . |
| 5,115,986 | 5/1992 | Bateson et al. ............................. 241/20 |
| 5,228,921 | 7/1993 | Peterson .................................. 134/25.1 |
| 5,234,504 | 8/1993 | Peterson et al. ......................... 134/25.1 |
| 5,316,223 | 5/1994 | Lahoda et al. .............................. 241/24 |
| 5,421,527 | 6/1995 | Corte ......................................... 241/20 |

*Primary Examiner*—John M. Husar
*Attorney, Agent, or Firm*—Darby & Darby

[57] ABSTRACT

A soil washing apparatus utilizing a water-based surfactant to separate contaminants from soil particles with particle sizes within a predetermined range. After removing the surfactant/contaminant/water mixture from the soil particles, the soil is returned to the remediation site, while the mixture is processed through an oil/water separator. Oil and contaminants are then disposed of, while the water and surfactant are centrifuged, and the resulting supernatant is recycled back into the apparatus for use with more contaminated soil. A method of soil washing is also provided.

9 Claims, 8 Drawing Sheets

METHOD AND APPARATUS FOR WASHING SOIL

This is a continuation of application Ser. No. 08/314,430, filed Sep. 28, 1994 now abandoned, which is a continuation-in-part of application Ser. No. 07/846,347, filed Mar. 5, 1992, abandoned.

FIELD OF THE INVENTION

This invention relates generally to devices for pollution remediation. More specifically, this invention relates to a device for extracting contaminants from soil.

BACKGROUND OF THE INVENTION

As government, industry, and society in general have become more aware of pollution and its effect on the environment, the vast extent of existing contamination has also become fully realized. Responding to the public interest, government has imposed restrictions on industry to reduce and prevent further pollution and to mandate the clean-up of past contamination and return the local environment to its previous natural state.

Of course, the incidents involving chemical industries that produce toxic waste are well documented. Less known, but affecting a possibly broader segment of the population is the contamination produced by the petroleum industry and its products. Tanker spills on the open seas can be enormous but cleaning these spills often may only require oil booms and water skimmers to reclaim some of the oil, while the remainder simply evaporates. The oil spills and leaks on land, however, present more difficult obstacles to cleaning.

This type of contamination can be caused by leaking or incorrectly connected pipes, leaking fuel tanks, and improperly used fuel dispensers to name a few. When these leaks are either above or below ground, the petrochemicals, i.e., volatile and semi-volatile organic compounds, become absorbed into the soil and water table, making their removal difficult. Often, these areas of contamination are not discovered until they have become a large problem affecting many cubic yards of soil. From leaking underground tanks at gasoline stations alone, these contaminated areas are counted by the hundred thousands, throughout the nation. And in each case, without prompt action, the contaminants can reach local water supplies or agricultural areas.

Removing contaminants from underground water supplies can be accomplished through many known methods and devices. Removing the same contaminants from soil, however, has to date been a crude process achieving limited success. Current state-of-the-art devices and methods make use of alcohol- or petroleum-based solvents in connection with settling tanks to dissolve the contaminants from the larger particles, such as those larger than 63 microns in diameter (270 mesh size) and returning those cleaned particles to the previously contaminated site.

Smaller particles remain in the slurry with the solvents and the contaminants. This slurry is then containerized and shipped to a waste disposal site. Except for the now-cleaned large soil particles, the solvents, contaminants and smaller particles become contaminated waste for another, admittedly more controlled, site. To clean more soil, it is necessary to begin the process again with new solvents. In essence, these are batch processes in that a load of soil is treated with the device through to completion. Then, another load can be installed into the device for treatment.

Thus, in view of the above-mentioned deficiencies in the art, an object of the invention is to provide a device and method for removing contaminants from a wide range of particle sizes for return to the previously contaminated site.

It is another object of the invention to provide a device and method for removal of soil contaminants that provides flexibility to control the return cut size between particles returned to the site and those constituting residual waste.

It is another object of the invention to provide a continuous device and method for soil washing that allows continuous addition of contaminated soil.

It is yet another object of the invention to provide a closed-loop system that reuses the contamination removal agent.

It is a further object of the invention to provide a device and method for soil washing that does not add to the pollution waste stream.

It is a still further object to provide a device and method that is simple and cost-efficient to manufacture and operate.

SUMMARY OF THE INVENTION

In accordance with the above objects, a soil washing apparatus is provided utilizing a water-based surfactant to separate contaminants from soil particles having particles sizes within a predetermined range. After removing the surfactant/contaminant/water mixture from the soil particles, the soil is returned to the remediation site, while the mixture is processed through an oil/water separator. Oil and contaminants recovered from the oil/water separator are then disposed of. The water and surfactant recovered from the oil/water separator may be recycled back into the apparatus for use with more contaminated soil. The water and surfactant recovered from the oil/water separator may centrifuged if necessary to remove suspended particles, and the supernatant recovered from the centrifuge is then recycled back into the apparatus for use with more contaminated soil. A method of soil washing is also provided.

BRIEF DESCRIPTION OF THE DRAWINGS

These and other objects, advantages and embodiments will become apparent to those skilled in the art upon a reading of the detailed description of the preferred embodiments in conjunction with a review of the appended drawings, in which.

DETAILED DESCRIPTION OF THE PREFERRED EMBODIMENTS

Figure 6:
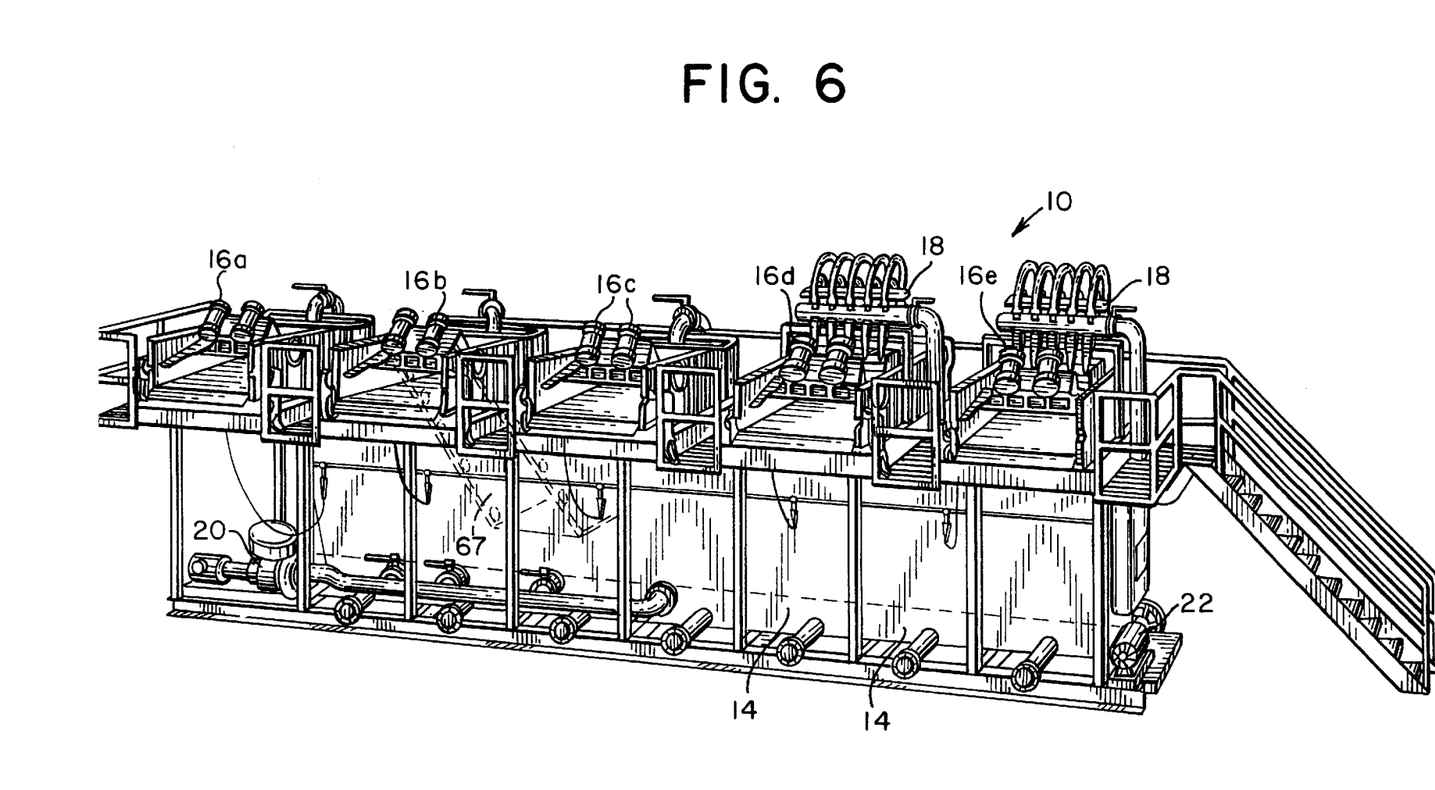
FIG. 6 is a plan view of an embodiment of the apparatus of the present invention.

Referring now to FIG. 6, an embodiment of the soil washing apparatus 10 of the present invention is shown. The general components of the invention, all of which will be described more fully below, include a series of skimming tanks 14, a series of soil shakers 16 positioned above the skimming tanks 14, desilter units 18, pumps 20, 22, an oil water separator 24. Conveyor belt unit 67 may be utilized to remove treated soil from the apparatus and return it to the site.

Figure 9:
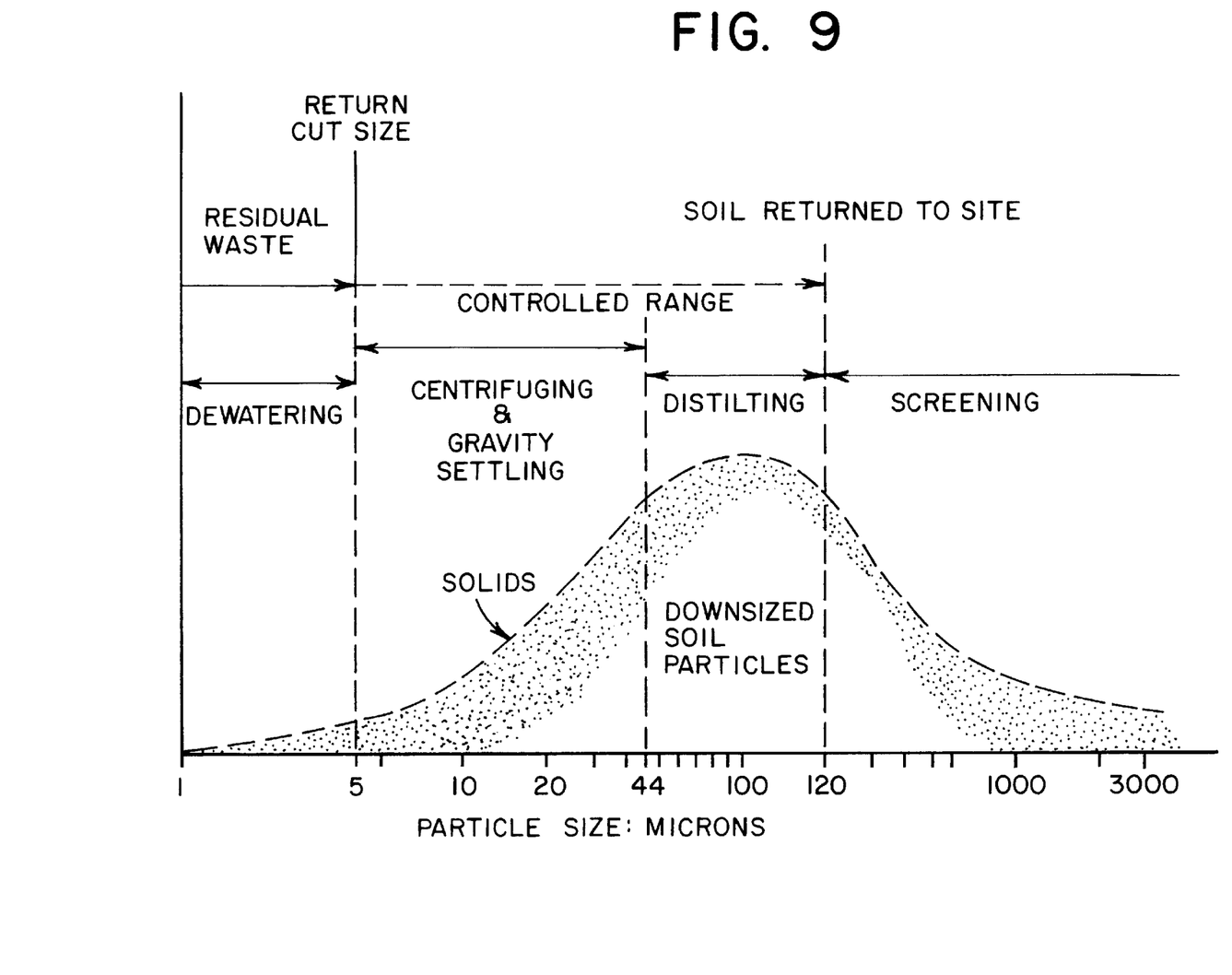
FIG. 9 is a diagram illustrating the control over return cut size which may be obtained utilizing various embodiments of the present invention.

As shown in FIG. 9, the process of the invention provides the flexibility to control the return cut size between soil particles returned to the site and those constituting residual waste. The concept of reducing soil contamination through the use of particle size separation is based on the finding that many organic and inorganic contaminants tend to bind, either chemically or physically to clay and silt soil particles. The silt and clay in turn, are bound to sand and gravel particles by physical processes, primarily compaction and adhesion. Washing processes which separate the fine (small) clay and silt particles from the coarser sand and gravel particles effectively separate and concentrate the contaminants into a smaller volume of soil which can be further treated or disposed. The clean larger fraction may be returned to the site for continued use.

The ideal cut size is initially determined from laboratory testing using samples of the soil from the site to be cleaned. The classification is determined using techniques of particle separation which are well known in the petroleum drilling industry, primarily seiving. Based on the particle size distribution found in the sample, the required configuration of separators, which may include any or all of screening, desilting, centrifugation or gravity settling, is determined for the job.

The process of the invention is highly effective in removing contaminants from clay based soils, such as Louisiana Blue Clay and Red Clay. When added to water, clay forms a solution with the water. It is very difficult if not impossible for systems designed for coarse separation to remove clay from solution. Particles in suspension on the other hand, may be more easily removed from the water by particle segregation techniques. Of the various soil types, sandy soil is the easiest to separate. Clays are the most difficult, primarily because clay is water soluble.

Figure 1A:
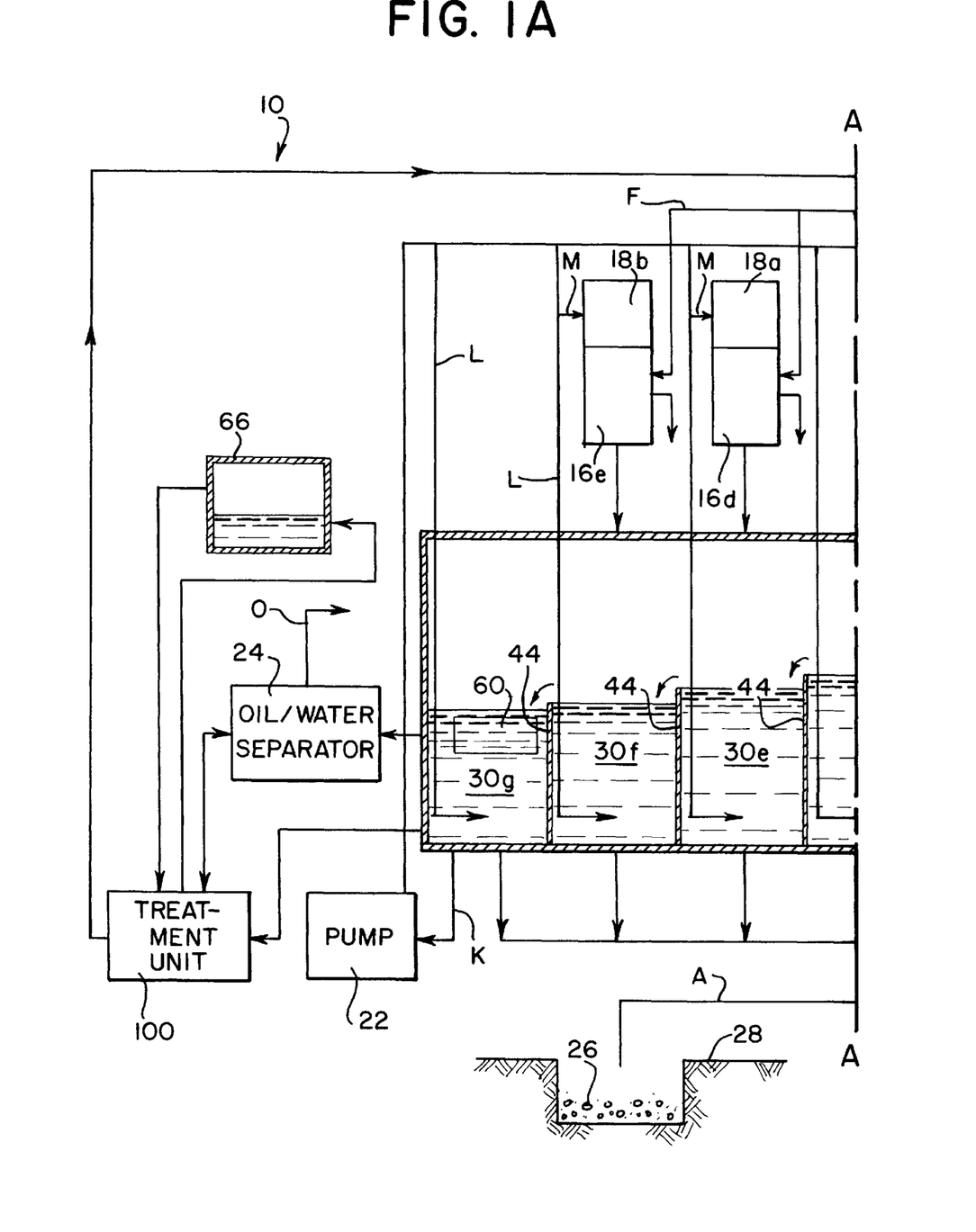
FIGS. 1A and 1B is a schematic flow diagram of a soil washing apparatus according the invention.
Figure 1B:
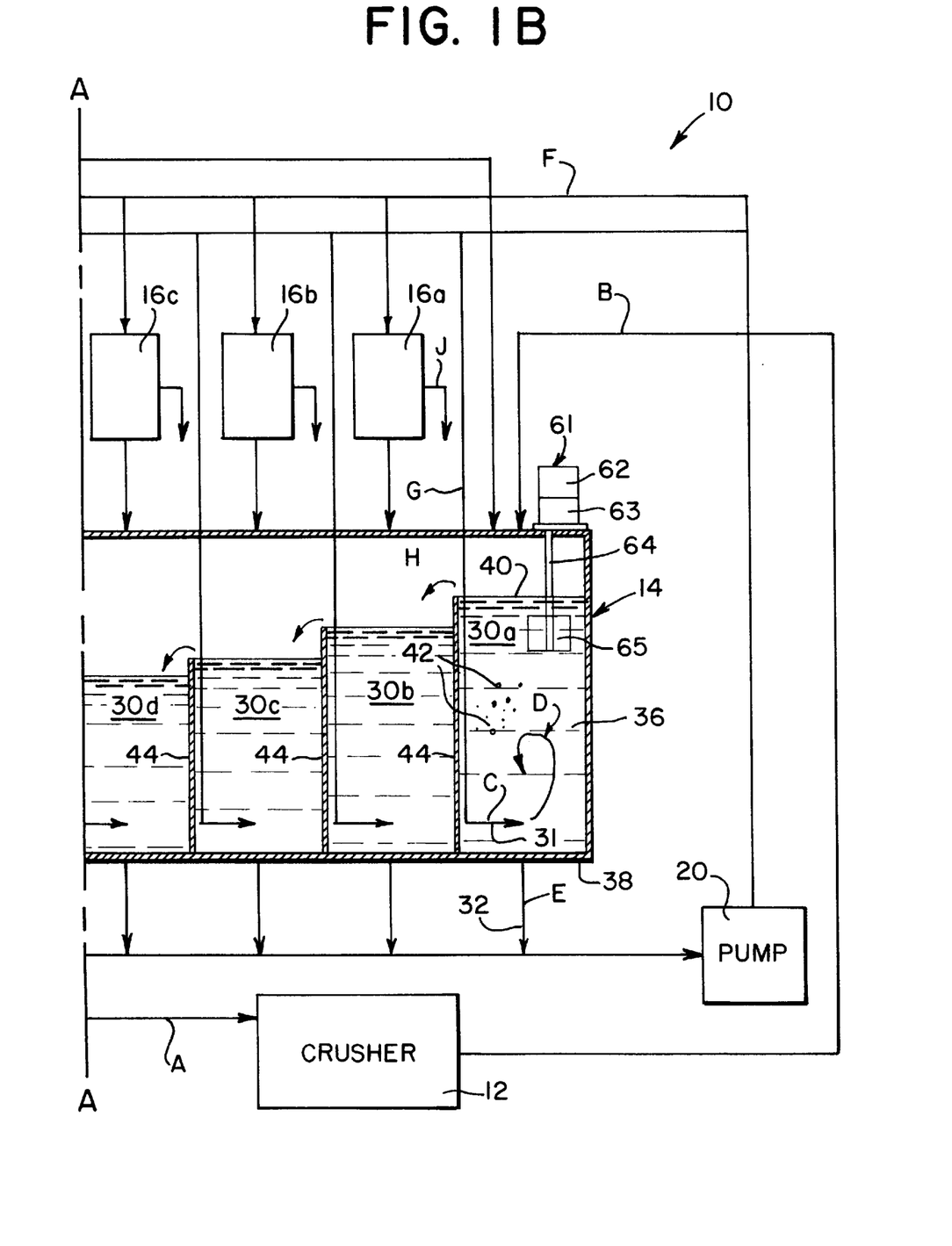
Figure 2:
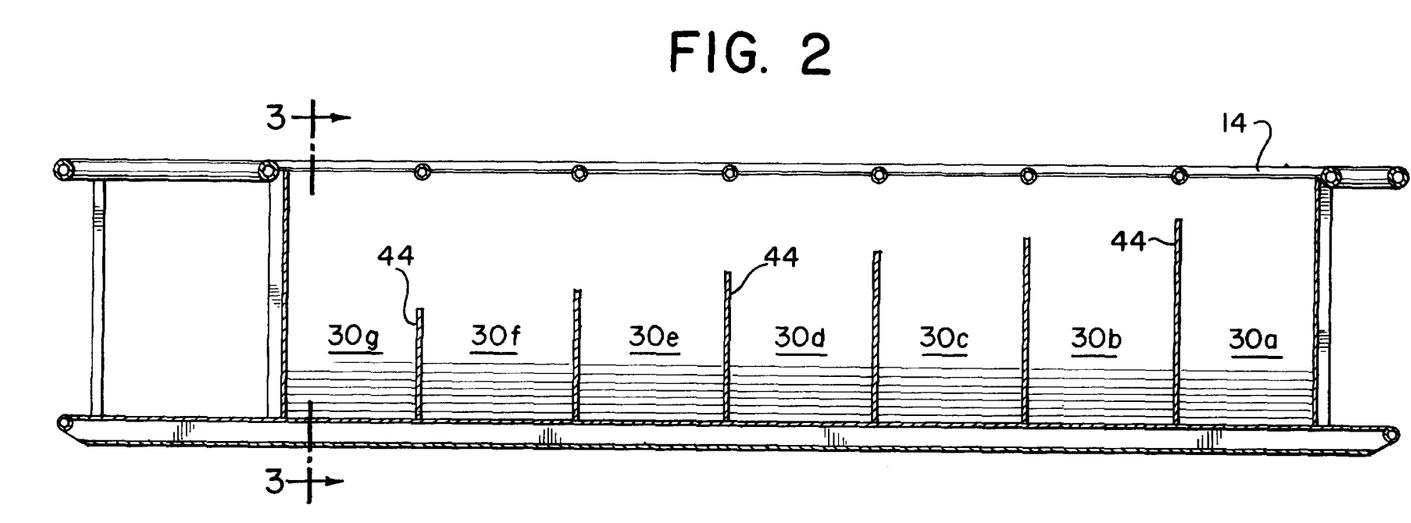
FIG. 2 is a longitudinal cross-sectional view of a skimming tank.

A schematic diagram of a preferred apparatus 10 of the present invention is shown in FIGS. 1A and 1B. The process begins by collecting contaminated soil 26 from the site 28.

Various contaminants can be removed using the apparatus or method of the invention, although it is preferred that the soil 26 is contaminated with volatile and semi-volatile organic compounds, such as petroleum products. Examples of such contaminants include heavy and light end hydrocarbons, such as diesel, number two fuel oil, gasoline, kerosene, naptha, asphaltenes and crude oil. Other types of contaminants include heavy metals such as uranium, cadmium, arsenic, chromium, zinc, lead and selenium; organic pesticides and other organic industrial chemicals, such as PCBs (polychlorinated biphenyls).

As will be seen below, apparatus 10 is capable of returning a large majority of the same soil 26 to the same site 28, but without the contamination.

For ease of description, the specific components of the apparatus will be described in the general order they would be encountered by contaminated soil 26 travelling through the device, as follows:

Soil 26 is collected and introduced into the apparatus. The soil preferably first enters a crusher 12 at A. The crusher 12 can be any known device that mechanically applies compressive and/or shearing pressure to break the soil 26 into a small granular or powder size form. It is preferred that the crusher crush the soil into particles not exceeding about ½ inch in diameter. This crushing operation can be particularly important in areas that have high clay or silt concentrations. Clay and silt tend to retain contaminants and to form and remain in clumps, with themselves or other soil components, providing little surface area for the action of any treating agents. By breaking up the soil, the surface area is increased exponentially.

The crushed soil is then transported, such as by a conveyor belt (not shown), and deposited at B into the first chamber 30a of the skimming tank 14. Preferably before any soil is introduced into the apparatus, the skimming tank 14 is partially filled with a solvent or a surfactant solution. The type of solvent or surfactant utilized in the invention may be determined based on the soil composition and the contaminant to be removed, and is preferably non-toxic, have low flammability, and be anti-foaming. Factors to be considered in selecting a a surfactant include the electrostatic charge of the soil; particle size distribution; and pH. For example, to remove hydrocarbons, a combination of water and a water-based surfactant is preferred, such as Fluid D-10, a non-ionic synthetic fatty acid surfactant available from Coastal Chemical Co. of Abbeville, La. Other solvents and surfactants which may be utilized in the process of the invention include BCD, available from Total Rust & Corrosion, of Georgia.

The exact surfactant within that category and the proportion relative to the water content is determined based on the composition of the soil. Generally, to remove hydrocarbons a 1 to 30% aqueous solution of the surfactant may be used, more preferably about 3 to 10%. Other additives may be necessary or desirable depending on the soil sample and environment. For example, it may be necessary to include enzymes to break down surfactants.

As the soil 26 enters the first chamber 30a, it is quickly stirred into the water/surfactant mixture at C by the action of flow from an inlet pipe 31 that forms a jet near the bottom of the tank 14, with the pressure being produced by the first pump 20. This creates swirling motion of the fluid 36 within the chamber 30a, as indicated by the arrow D. The fluid 36 is thus sheared by the turbulent flow within the chamber 30a, increasing the interaction between the surfactant and the soil.

Figure 3:
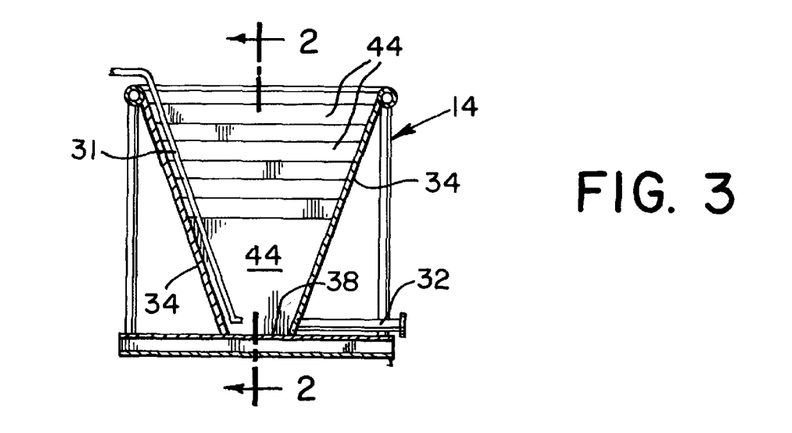
FIG. 3 is a transverse cross-sectional view of a skimming tank.

As seen from FIG. 3, the sidewalls 34 of the tank 14 are preferably sloped with the pipe 31 entering the tank preferably along one wall 34 and directed towards the opposite sloped wall 34. The sloped sidewalls 34 form a v-bottom 38, which helps prevent soil particles from resting in the bottom of the tank.

To further increase the turbulent flow of the fluid within the tank 14, an optional agitation unit 61 may be added. Such agitation units are well known in the art, may consist of, for example, an electric motor 62, a reduction gear box 63, a shaft 64, and a plurality of rotating paddles 65. To maintain proper agitation of the fluid 36 within the tank, the paddles 65 are preferably placed about 12 inches above the bottom of the tank.

The surfactant has been shown to act on the contaminants in two ways. First, the surfactant emulsifies the contaminants. Second, it encapsulates the small contaminant particles, aiding them in floating to the top layer of the fluid, which the contaminants are already predisposed to do, being less dense than water. Thus, one result of the mixing action within the first chamber 30a is the separation from the soil particles of some contaminants, which tend to float to the top 40 of the fluid 36.

The soil particles 42 within the fluid 36 have two routes for leaving the first chamber 30a. Larger particles, i.e., those having a diameter larger than about 10 microns, will tend to settle near the bottom 38 of the tank 14 despite the churning action of the inlet pipe 31 and/or the optional agitation unit 61. To keep the larger particles (greater than about 70 microns) suspended in the fluid 36, addition of the above-described agitation unit 61 is recommended.

The larger the particle 42, the lower it will likely be found in the tank 14. These larger particles 42 and some smaller ones caught in the fluid 36 near the bottom 38 are drawn, with fluid 36, out of the tank 14 at the exit pipe 32 at E which is opposite to the inlet pipe 31. The fluid 36 and particles 42 are drawn through the first pump 20, which is a modified impeller pump. There are more blades on the impeller in the pump 20 than in a conventional unit in order to move both the solids and fluid 36 through the pump 20. The pump also provides further justification for the crusher 12, as the particles 42 must all be small enough to pass through the first pump 20. The fluid 36 and suspended solids 42 are then deposited at F onto the top surface of a series of soil shakers 16a–16e, described more fully below. The fluid 36 is also split off at G and fed to the inlet ports 32 to produce the motion D.

The other route for soil particles to leave the first chamber 30a is by being suspended in the fluid 36 and carried by the fluid flow over the first skimming wall 44 into the second chamber 30b, of the tank 14 at H. The height of the skimming wall 44 is preferably adjusted in conjunction with the flow rate of the pumps 20,22 to cause a predetermined depth of fluid to be continuously skimmed off the top of fluid in the first chamber 30a. This skimmed fluid will contain a majority of the contaminants from the fluid in the first chamber 30a due to the emulsifying and floating action of the surfactant.

Figures 4, 5:
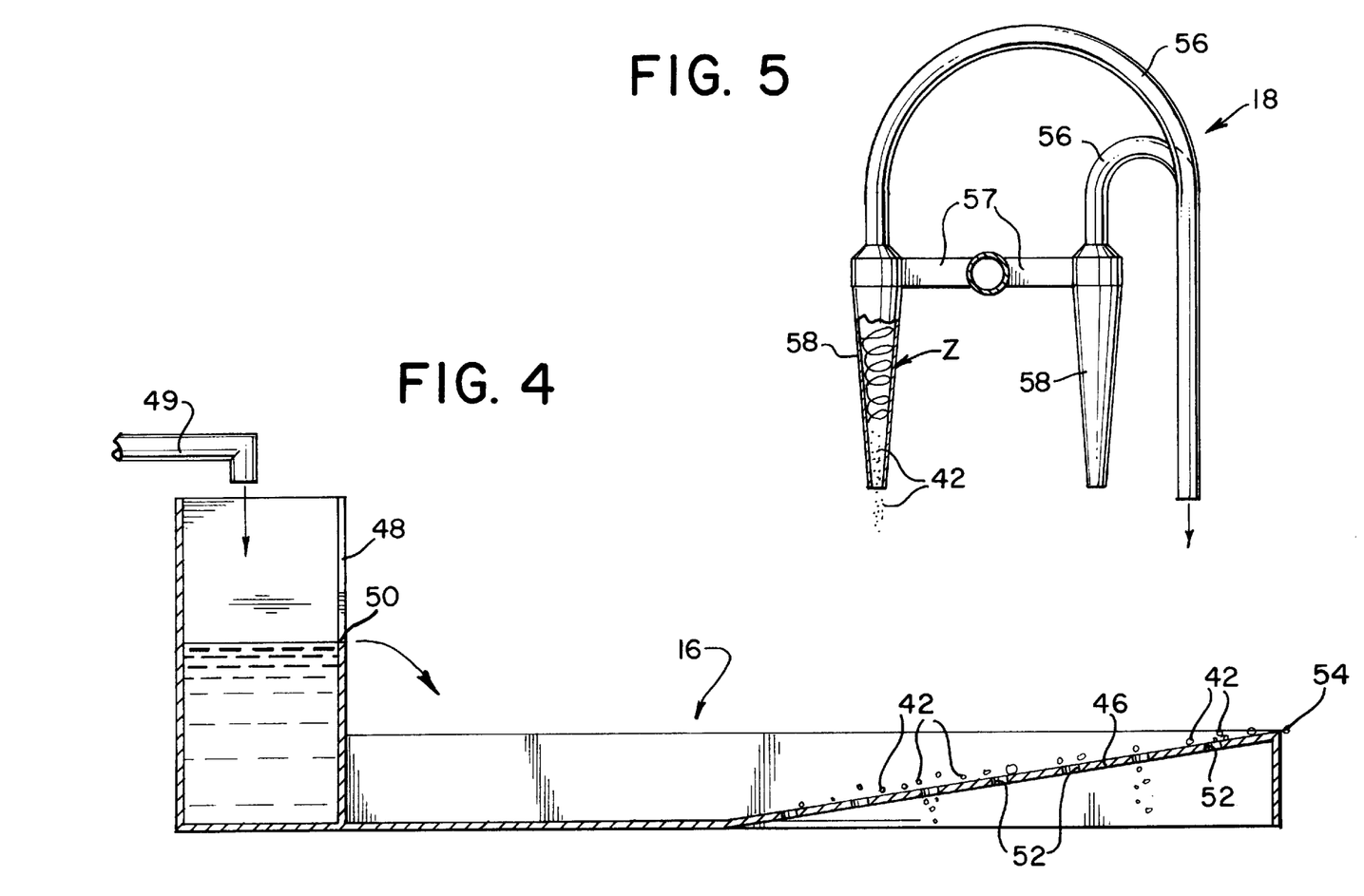
FIG. 4 is a side cross-sectional view of a soil shaker.
FIG. 5 is a side view of a desilter.

The several shakers 16a–16e preferably all operate in a similar manner, except for the porosity or mesh size of their respective screens 46. Each shaker, as shown in FIG. 4, has a rear chamber 48 into which a pipe 49 discharges fluid from the first pump 20. The fluid fills the chamber 48 and spills over the forward edge 50 of the chamber onto the sifting screen 46. The screen 46, which is mounted in the bottom of the shaker 16 at an angle, allows the passage of all materials having a particle size smaller than the size of the holes 52 in the screen.

As is known in the industry, the entire shaker 16 is shaken with reciprocating linear movement along a horizontal axis. This movement is created by rotating eccentrically mounted weights (not shown) with motors mounted to the shakers 16, as is known in the industry. The movement is designed to cause material resting on the screen 46 to slide forward slightly with each cycle of motion, and perhaps falling through one of the holes 52 if the particle is small enough. In FIG. 4, the size of the holes 52 is exaggerated for illustrative purposes. Since the screen 46 is sloped upward in the forward direction, soil particles 42 will move against gravity and thus, more slowly up the screen 46, giving them more of a chance to fall through the holes 52. Eventually, if the particles 42 do not fall through the screen 46, they will be ejected off of the forward end 54 of the screen 46 into a collection bin (at J, FIG. 1B) for immediate return to the site 28. If necessary, analytical tests may be performed on the soil before its return.

All of the fluid and the smaller particles that fall through the shaker screen 46 will fall back into the skimming tank 14, but into a chamber downstream from the first chamber 30a. As can be seen in FIG. 1, the shakers 16a–16e are preferably positioned directly over the chambers 30b–30f, although the forward edge 54 of the screen 46 is preferably positioned past the outer edge of the tank 14 such that particles 42 ejected from the front and 54 of the screen will not fall back into the tank 14, but can be returned to the site 28. Of course, the number of chambers 30 and shakers 16 may be varied depending on soil composition and the level of contamination.

The subsequent chambers 30b–30f after the first, 30a, are generally similar, except for the last chamber 30g, which is described more fully below. All of the subsequent chambers 30b–30g have input pipes 32 to cause the swirling effect within the chambers 30. All of the chambers 30b–30f except the last one 30g have exit ports and pipes that lead through the first pump 20 to the soil shakers 16a–16e.

The amount of time a particular soil sample spends in the device or in any particular section of the device can preferably be adjusted through a number of valves (not shown) positioned along the various pipes of the device. For example, if valve 70a were closed, soil particles 42 would tend to remain in or be processed through the second and third chamber 30b–30c for a longer period, since the only route for entering the last three chambers 30e–30g would be over the skimming wall 44 between the fourth and fifth chambers 30d,30e. The valve positions and configurations may be adjusted as necessary for a particular application.

From the last chamber 30g, the exit port and pipe leads to a second pump 22 (at K), which is preferably a standard fluid pump, since the fluid is free, by this point, of larger particles 42. The pump 22 forces the fluid from this chamber 30g to the inlet ports of the last three chambers 30e–30g (at L), but also passes the fluid through desilter units 18a, 18b mounted over the last two shakers 16d, 16e (at M) By the time the fluid has reached the end chamber 30g, it preferably contains only those soil particles 42 that are smaller than 35–40 microns. Particles of this size are essentially in suspension in the fluid and become difficult to separate through mere sifting. To first remove the particles 42 from suspension, it is preferred to pass the fluid from pump 22 through the desilter units 18 which are known in the industry as "hydrocyclones." As seen in FIG. 5, these units include cones 58, at the top of which are fluid inlets 57 that receive fluid from pump 22 and direct it into the top of cones 58 along the inner sidewall of the cone 58. This sets up a high-speed swirling effect in the cones, as shown at Z. The centrifugal force generated by this swirling causes the particles 42 to separate out of the fluid and fall through the bottom of the cones 58 and onto the last two shakers 16d, 16e. These shakers have the finest screens with holes 52 preferably having a 35 micron diameter (325 mesh). Simultaneously, the same force causes the clean water to spiral upward along the inner slope of the cone 58 and exit through the tubes 56. The tubes 56 empty back into the fifth and sixth chamber 30e, 30f of the tank 14.

Through the actions of the progressive skimming in the chambers 30, in combination with the surfactant in the tank 14, the soil shakers 16, and the desilting units 18, the fluid 36g in the final chamber 30g of the tank 14 is substantially free of any soil particles 42 having a diameter larger than 35–40 microns. Thus, this fluid 36g is chiefly composed of water, the surfactant, and the contaminants that were separated from the soil 26. Despite the churning of the fluid 36g, the surfactant and contaminants will tend to rise to the surface of the fluid in chamber 30g.

A floating skimmer unit 60 within the last chamber 30g of the tank 14 removes the fluid 36g from the top layer of the chamber 30g. This skimmed fluid is passed to an oil/water separator system 24 at N, such as the Verisep system, available from Monosep Corp., Lafayette, La. In the separator 24, the oil and other organic contaminants are separated from the water and the water-based surfactant. Alternatively, oil may be removed from the surface of chamber 30g using other known devices, such as an oil mop.

Figure 10:
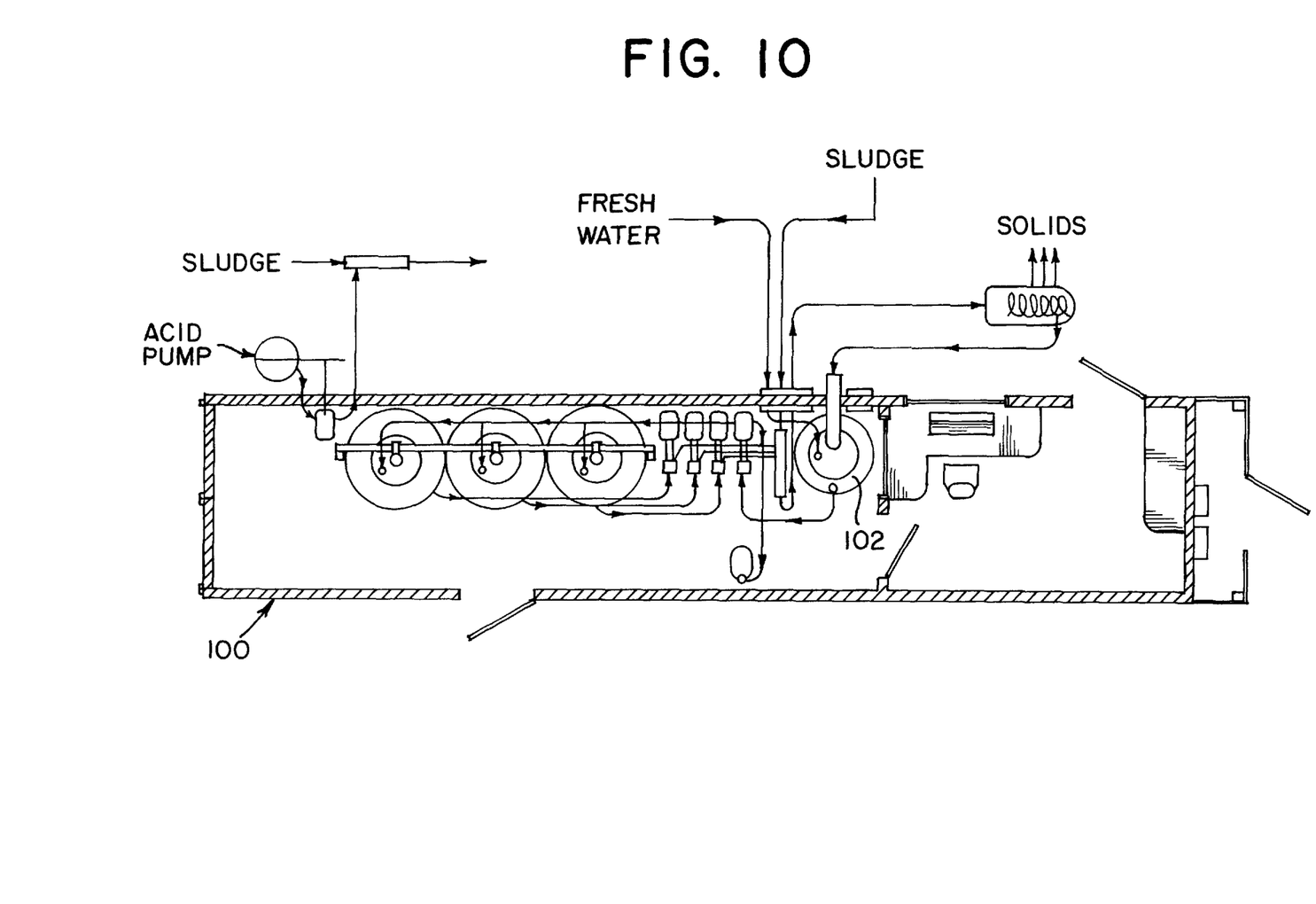
FIG. 10 is an overhead view of the water treatment unit.

Contaminated water separated from the oil/water separator is introduced to a water treatment unit 100. In addition, water from the bottom of tank 30g is also introduced to the water treatment unit. Upon introduction to the unit, the pH of the contaminated water is determined and adjusted (usually by the addition of acid) to pH 6–7.5 to obtain optimal flocculation The pH-balanced contaminated water is then mixed and one or more flocculants is added. It is preferred that an acrylic polymeric flocculant be used. The flocculants may be ionic, anionic or cationic. The water is thoroughly mixed using static in-line mixers, including a finned insert within the piping. Such mixers are available from Cole-Palmer, Houston. Addition of the flocculant causes contaminants in the water to precipate in the form of a flocculant. The flocculated water is then introduced to the centrifuge 66 to remove solids from the water. The solids are considered clean and are removed and returned to the site. The remaining flocculated water is returned to a catch tank 102 in the water treatment unit for testing and further treatment, if necessary. The supernatant is collected and monitored. The pH is measured and the fluid is checked for the presence of surfactant and contaminants. If no contaminants are found, the water is reintroduced to the system for reuse. If contaminants are found, the water is recycled through the water treatment system.

The oil fraction recovered from the separator 24 is then either containerized and shipped to a disposal site at 0 or, depending on the nature of the contaminants, processed through a scavenger system that can reclaim the petroleum products for later refining. In either case, only the contaminants must be disposed of.

The water/surfactant fraction removed from the separator 24 contains suspended soil particles of less than 2 microns in diameter.

The supernatant recovered from the centrifuge unit 66, which contains water and surfactant, is piped back to the water treatment unit 100. Meanwhile, water cleaned in the water treatment unit is piped back to the beginning of the process at P, preferably to the first chamber 30a of the skimming tank 14, completing the closed loop of the system.

Figure 7:
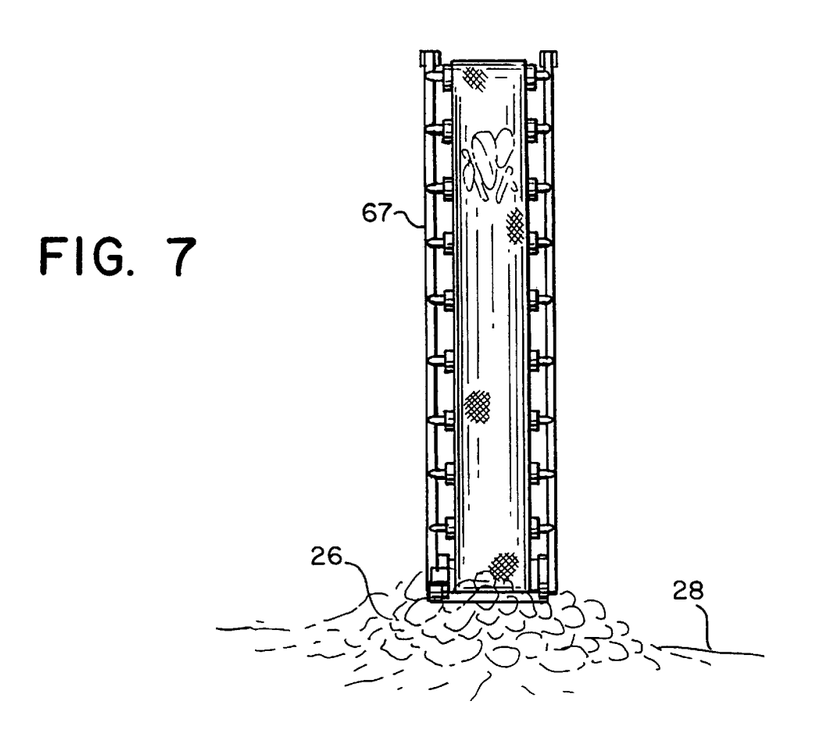
FIG. 7 is an overhead view of a conveyor belt which may be utilized to remove treated soil from the apparatus of the present invention and return it to the site.
Figure 8:
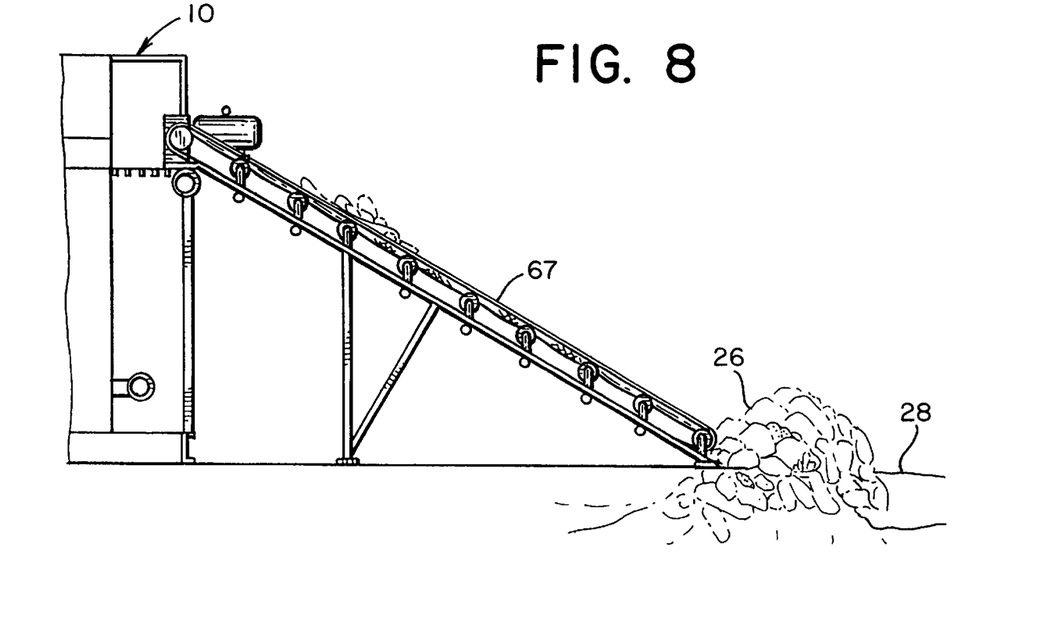
FIG. 8 is a side view of a conveyor belt which may be utilized to remove treated soil from the apparatus of the present invention and return it to the site.

The remainder of the soil 26, as well as the solid "pellet" recovered from the centrifuge unit 66, which are now free of contamination, may be returned to the site 28 from which they were removed by, for example, a conveyor belt or other similar means (See FIGS. 7–8). Because the device 10 may be installed at the contaminated site 28, minimal excavation and transportation costs are incurred for carrying the soil 26 to the device or returning the clean soil 26 to the site 28.

Essentially, the only materials that are ejected by the device are clean soil particles and contaminants, which are the only materials introduced to the device while it is running. The water and surfactant travels and circulates through the machine continuously. The solids which remain suspended in the water and surfactant solution must eventually also be disposed of, but this only accounts for a minute fraction of the total soil processed.

While it is possible that trace amounts of the surfactant may remain on the cleaned soil 26, the preferred surfactant is non-toxic and biodegradable and meets all government standards for environmental release (for example, EPA standard D-2667) and may be returned to the site 28 with the soil 26. Since the surfactant contains fatty acids, it is biodegradable and breaks down quickly.

The removal of trace amounts of surfactant from the system, over time, will cause the concentration of the surfactant in the skimming tank to decrease slightly. Thus, it is preferable to monitor the concentration and adjust it accordingly. The monitoring may be done by manual sampling, or preferably with an optical detection system (not shown) that automatically monitors the light transmissivity of the water/surfactant solution, as is known.

As noted above, it is contemplated by the invention that contaminants other than organic compounds may be separated from the soil, and efficient removal of these materials may require some modification of the apparatus of the invention. For example, to remove some metals, the pH of the water may be altered and a conventional stripping tower added to the device, preferably at 0 in FIG. 1A.

While the embodiments shown are fully capable of achieving the objects of the invention, it is to be understood that these embodiments are shown for the purpose of illustration and not for limitation.

EXAMPLE

The method and apparatus of the present invention was subjected to a field trial to evaluate the capacity and efficiency of the invention in removing petroleum hydrocarbons from impacted soils.

In the initial phase of the trial, the machine, which included 5 shaker screens, 2 hydrocyclones, and a centrifuge unit, was tested under full throughput conditions for a period of several hours using uncontaminated soil. The throughput of the machine was determined to be about 30±15% tons per hour.

In a second phase of the trial, the machine was evaluated with a feed consisting of an impacted clay soil at the design throughput rate of 30±15% tons per hour. The hydrocarbons added to the clay soil consisted of gasoline, used motor oil and diesel fuel, which had been added to the soil approximately 2–3 months prior to the test run. The machine was operated for approximately one hour and the machine outputs were sampled three times to assess performance.

The soils in the second phase of the trial were characterized by a TPH (total petroleum hydrocarbons) contamination of 56,000 ppm (EPA Method 418.1), and about 88% of the soil particles were in the clay fraction particle size range. The moisture content of the soil was about 25% by weight.

The particle size distribution of the soil tested in the second phase of the trial is reported in Table 1 below:

TABLE 1

| PARTICLE SIZE DISTRIBUTION IN INITIAL SOIL SAMPLE | |
|---|---|
| MICRON SIZE RANGE | VOLUME % RANGE |
| >991 | Trace |
| 178–991 | 4.50 |
| 140–178 | 2.00 |
| 125–140 | 3.00 |
| 105–125 | 0.25 |
| 74–200 | 2.50 |
| 70–74 | 11.05 |
| 50–70 | 5.53 |

TABLE 1-continued

PARTICLE SIZE DISTRIBUTION IN
INITIAL SOIL SAMPLE

| MICRON SIZE RANGE | VOLUME % RANGE |
|---|---|
| 40–50 | 3.50 |
| 30–40 | 2.81 |
| 25–30 | 5.00 |
| 20–25 | 7.81 |
| 15–20 | 10.44 |
| 10–15 | 8.69 |
| 8–10 | 7.72 |
| 6–8 | 7.37 |
| 5–6 | 5.00 |
| 4–5 | 4.30 |
| 3–4 | 3.77 |
| 2–3 | 4.65 |

The results of treatment with the apparatus of the invention are set forth in Table 2 below.

TABLE 2

SOIL ANALYTICAL DATA

| SAMPLE LOCATION | TREATED SOIL TPH (ppm) | REMOVAL EFFICIENCY | MOISTURE wt. % | PERCENT OF SOLIDS BELOW 74 μm (volume) |
|---|---|---|---|---|
| Shaker screens - 1,2,3 (large fraction soils major point of soil discharge) | 224 | 99% | 25.01 | 97.65% |
| Shaker Screens - 4,5 (fine fraction soils minor point of soil discharge) | 68 | 99% | 23.25 | 99.15% |
| Centrifuge wash water recycle treatment | 125 | 99% | 33.01 | 92.15% |

The results in Table 2 indicate that the soil washing system of the invention was highly effective and efficient (99.5%) in removing the hydrocarbon contamination from the clay soil.

The invention was also highly effective in removing moisture from the clean soil fraction. The range in moisture content following treatment was in the range of 23–33%, while the initial moisture content of the soil was in the same range as the treated soil 25%.

The apparatus of the invention produced a clean, fine fraction (125 ppm TPH) from the centrifuge wash water treatment system, demonstrating that all of the soil was treated with no fine fraction residual stream requiring disposal and/or further treatment.

The wash water recovered from the apparatus of the invention is described in Table 3 below.

TABLE 3

WASH WATER ANALYTICAL DATA

| PARAMETER | VALUE |
|---|---|
| Chemical Oxygen Demand | 140 ppm |
| pH | 6.66 |
| Suspended Solids | 26 ppm |
| Total Petroleum Hydrocarbons | 3.0 ppm |

The results in Table 3 show that the apparatus of the invention produced clean wash water with a very low contaminant level of 3 ppm TPH. The wash water centrifuge system produced a clean effluent with a suspended solids concentration of 26 ppm.

What is claimed is:

1. An apparatus for washing soil having incorporated contaminants, said soil being mixed with water to form a slurry, comprising:

a tank for holding said slurry having first, second and third chambers with a first skimming wall between said first and second chambers and second skimming wall between said second and third chambers;

first means for sifting said slurry to remove first soil particles greater than a first predetermined size from said slurry, said means for sifting positioned such that said first soil particles will be deposited remote from said tank, while the remaining portion of said slurry will be deposited into said second chamber of tank;

second means for sifting said slurry, said second means for sifting removing second soil particles greater than a second predetermined size from said slurry, said second means for sifting positioned such that said second soil particles will be deposited remote from said tank, while the remaining portion of said slurry will be deposited into said third chamber;

a pump for pumping said slurry into each of said chambers to thereby agitate said slurry, said pump also pumping said slurry from said chambers onto said first and second means for sifting;

a skimmer within said tank for removing a top layer of said slurry from said tank, said layer being substantially devoid of soil particles;

an oil/water separator having an inlet connected to said skimmer and having two output flows, said first output flow including said contaminants, said second output flow including said water and surfactant previously introduced to said slurry; and a centrifuge for centrifuging said second output flow.

2. The apparatus of claim 1, wherein said second output flow is directed to said tank.

3. The apparatus of claim 1, further comprising means for desilting said slurry to remove soil particles therefrom.

4. The apparatus of claim 3, wherein said means for desilting comprises a hydrocyclone, wherein said hydrocyclone removes particles having a diameter greater than approximately 2 microns.

5. The apparatus of claim 1, further comprising means for crushing said soil before said soil is mixed with water to form said slurry.

6. The apparatus of claim 1, wherein said means for centrifuging produces a supernatant, and wherein said supernatant is directed to said tank.

7. The apparatus of claim 1, wherein said chambers further comprise means for agitating said slurry.

8. The apparatus of claim 1, further comprising water treatment step, including adding a flocculant to the aqueous fraction from said oil/water separator to cause the precipation of a flocculant, and centrifuging said fluid to remove said flocculant.

9. An apparatus for washing soil having incorporated contaminants, said soil being mixed with water to form a slurry, comprising:

a tank for holding said slurry having first, second and third chambers with a first skimming wall between said first and second chambers and second skimming wall between said second and third chambers;

first means for sifting said slurry to remove first soil particles greater than a first predetermined size from said slurry, said means for sifting positioned such that said first soil particles will be deposited remote from said tank, while the remaining portion of said slurry will be deposited into said second chamber of tank;

second means for sifting said slurry, said second means for sifting removing second soil particles greater than a second predetermined size from said slurry, said second means for sifting positioned such that said second soil particles will be deposited remote from said tank, while the remaining portion of said slurry will be deposited into said third chamber;

a pump for pumping said slurry into each of said chambers to thereby agitate said slurry, said pump also pumping said slurry from said chambers onto said first and second means for sifting;

means for isolating a non-aqueous fraction of said slurry, said fraction being substantially devoid of soil particles; and treating said non-aqueous fraction with a flocculating agent to cause the precipation of a flocculate, and separating said flocculate from said fraction.

\* \* \* \* \*